United States Patent [19]

Kobayashi et al.

[11] 4,057,606
[45] Nov. 8, 1977

[54] METHOD OF PRODUCING ANISOTROPIC FERRITE MAGNET

[75] Inventors: Seihin Kobayashi, Kosai; Michihiro Torii, Hamamatsu; Hiroaki Kobayashi, Toyohashi, all of Japan

[73] Assignee: Fuji Electrochemical Co., Ltd., Tokyo, Japan

[21] Appl. No.: 616,681

[22] Filed: Sept. 25, 1975

Related U.S. Application Data

[63] Continuation-in-part of Ser. No. 429,739, Jan. 2, 1974, abandoned.

[30] Foreign Application Priority Data

July 14, 1972    Japan .................................. 47-70010
July 14, 1972    Japan .................................. 47-70011

[51] Int. Cl.$^2$ ............................................. B06B 1/02
[52] U.S. Cl. ........................................ 264/24; 264/63; 264/DIG. 58
[58] Field of Search .............. 264/24, 61, 63, DIG. 58

[56] References Cited

U.S. PATENT DOCUMENTS

| 3,110,675 | 11/1963 | Brailowsky | 264/24 |
| 3,602,986 | 9/1971 | Conwicke et al. | 264/24 |
| 3,903,228 | 9/1975 | Riedl et al. | 264/24 |

FOREIGN PATENT DOCUMENTS

| 2,140,320 | 10/1972 | Germany | 264/DIG. 58 |
| 1,646,530 | 10/1971 | Germany | 264/DIG. 58 |

Primary Examiner—Donald J. Arnold
Assistant Examiner—John Parrish
Attorney, Agent, or Firm—Fleit & Jacobson

[57] ABSTRACT

A method is provided which comprises preparing pulverized ferrite having a magnetoplumbite type crystal structure of hexagonal system, mixing and kneading the ferrite with a viscous binding agent, subjecting the mixture to rolling to form a sheet-like mass with the easy axis being orientated in the direction perpendicular to the plane of the ferrite sheet by making use of anisotropic configuration of the crystal grains of the pulverized ferrite, rolling the sheet-like mass into a desired shape, and sintering and magnetizing the shaped ferrite.

9 Claims, 7 Drawing Figures

METHOD OF PRODUCING ANISOTROPIC FERRITE MAGNET

This is a continuation in part of application Ser. No. 429,739, filed 1-2-74, now abandoned.

This invention relates to a method of producing a radially oriented anisotropic ferrite magnet, and more particularly to a method of producing a magnet of the type which has a so-called magnetoplumbite type crystal structure of the hexagonal system composed from the combination of an oxide of material such as barium, strontium, lead or the like and ferric oxide and which has the easy axis along the C-axis.

Generally, the ferrite power composing the above-mentioned ferrite magnet has a magnetoplumbite type crystal structure of the hexagonal system composed substantially from a substance having the chemical composition $MO.6Fe_2O_3$ (where M is Ba, Sr, Pb or the like). This ferrite powder has the easy axis along the C-axis and its crystal is apt to develop in the direction vertical to the C-axis. When sintered, it is reduced into flat plate-shaped crystal grains.

If the powder of this type of ferrite is simply subjected to compression molding, the C-axis of the crystal runs in random directions, so that the material is worked into an isotropic magnet. Such isotropic magnet is small in energy product as compared with an anisotropic magnet which has been prepared from compression molding by orientating the C-axis of the crystal in a certain set direction, so that the former is less suited for use in various types of electric machines and instruments such as a small-capacity motor, a magnet for a head-phone, etc. For instance, in the case of barium type ferrite magnet, if it is isotropic, its energy product (B.H) max is merely on the order of 0.2 to $1.2 \times 10^6$G.Oe, while if it is made into anisotropic magnet, (B.H)max is raised to the order of 2.0 to $3.5 \times 10^6$G.Oe.

Various methods have been proposed for inducing magnetic anisotropy during the compression molding. Among them, most typical is the magnetic field molding method. This magnetic field molding method is divided into two types, i.e. dry type and wet type. However, the magnets produced by the dry type are inferior in magnetic properties to those produced by the wet type, so that the wet type method is used for producing the magnets having excellent magnetic properties. This wet type magnetic field molding method comprises the steps of pulverizing barium ferrite which has been calcined with its crystal growth advanced to some extent, then mixing therein an organic binder and a solvent to form a slurry-like mixture, then applying thereto a magnetic field of a certain set direction from the outside to orientate the crystal grains in a predetermined direction while filtering them, and then subjecting them to compression molding.

Such wet type magnetic field molding method, however, has the following disadvantages:

1. Since the compression molding is performed after orientating the crystal grains in the direction of the easy axis by applying from outside a magnetic field to the pulverized ferrite dispersed in the solvent solution, the once attained orientation of the crystal grains may be disarranged to cause a change in directionality of the easy axis, resulting in deteriorated magnetic properties. Especially, it is difficult to produce a cylindrical anisotropic ferrite magnet having the easy axis in the radial direction, because the crystal grains oriented in the radial direction are compressed perpendicularly and, thereby, the easy axis becomes random.

2. As the product is molded from a slurry-like mass by gradually removing the solvent, the entire process takes a long time and hence is not suited for mass production.

3. For producing a ferrite magnetic of a desired configuration, it needs to prepare a mold that conforms to the particular configuration. Therefore, it is extremely uneconomical to produce different shapes of magnets.

4. As the compression force applied to every pulverized ferrite in the mold is not constant due to the shape of the mold, the product does not have uniform ferrite distribution.

5. In the manufacture of a cylindrical anisotropic ferrite magnet having the easy axis in the radial direction, if a too strong magnetic field is applied during the magnetic field molding, the iron core of the molding machine may be brought into a magnetically saturated state to cause reduction of magnetic permeability of the iron core, so that it becomes difficult to correctly orientate the easy axis in the radial direction. If the magnetic field applied is too weak, it is also impossible to correctly direct the easy axis in the radial direction. Particularly, extreme difficulty attends in orientating the easy axis in the radial direction when molding a mass having a height more than five times as long as its diameter.

With a view to finding a solution to the above problems, the present inventors have pursued extensive studies and experiments toward that end, and as an outcome thereof, have found the fact that if said pulverized ferrite mixed up with a binder is rolled with a roll or such, the crystal grains of ferrite are spontaneously laid one upon the other in regular order and the easy axis, which has been random, is forcibly orientated in the direction vertical to the sheet face. The present invention is based on these findings.

The primary object of the present invention, therefore, is to provide a novel method of producing a radially oriented anisotropic ferrite magnet which has excellent magnetic properties and which has to easy axis in the radial direction.

Another object of the present invention is to provide a method of producing a radially oriented anisotropic ferrite magnetic with easy molding and economically on a mass-production scale.

According to the present invention, there is provided a method of producing an anisotropic ferrite magnetic having a radial particle orientation comprising mixing pulverized ferrite particles with an organic binder suitable for forming ferrite magnets to develop the particles in the planar direction perpendicular to the C-axis, said pulverized ferrite particles having a hexagonal crystal structure of the magnetoplumbite type and comprising a substance having the chemical composition $MO:6Fe_2O_3$ in which M is Ba, Sr or Pb, said pulverized ferrite having been calcined and having a well-advanced crystal growth, rolling said mixture between calender rollers to form a ferrite sheet, said calender rollers being driven at substantially the same speed to align the particles with their easy axis oriented in a direction perpendicular to the plane of the ferrite sheet, keeping said ferrite sheet in an solvent circumstance at about 30° to 40° C, winding said sheet convolutely and tightly under pressure of about 0.1 to 5.0kg/cm² and temperature of about 30°–90° C to form a cylindrical shaped integral mass, cutting said cylindrical shaped integral mass into a desired shape of a cylinder, sintering the desired shape of the ferrite mass at about 1,100 to 1,3000° C and applying a magnetic field to said sintered mass to complete said anisotropic ferrite magnet having said radial particle orientation.

Shaping of an anisotropic ferrite magnet having the easy axis in the radial direction is directed by U.S. Pat. No. 3,602,986 issued to Joel A. Conwicke. In this patent, a lamination step under the pressure greater than 5,000 p.s.i. is conducted after a wound sheet is cut into a desired shape. This method has been found by the present inventors to be seriously disadvantageous in that each layer of the wound sheet is slipped out with one another and accordingly oriented magnetic properties are forced to be disarranged, and that the applied pressure greater than 5,000 p.s.i. is so large that strains and distortions apear in and on the ferrite sheet.

The aforementioned and other objects and features of the present invention will be apparent from the following detailed description of specific embodiments thereof, when read in conjunction with the accompanying drawings, in which FIG. 1(a) is a sectional view showing one step in the process of the present invention in which a kneaded mixture of pulverized ferrite and viscous binder is rolled down into a sheet by rollers;

Figure 1A:
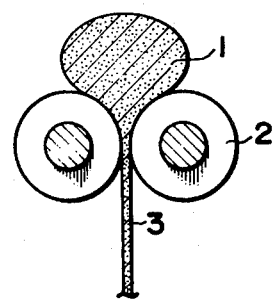
FIG. 1(b) is a sectional view showing another step in the present process in which a ferrite sheet is fed into an alcoholic circumstance.
FIG. 1(c) is a sectional view showing further step in the present process in which a ferrite sheet treated with an alcoholic circumstance is wound on a mandrel under pressure.
Figure 2A:
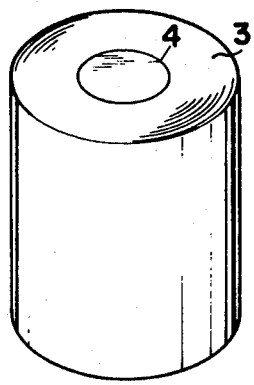
Figure 2B:
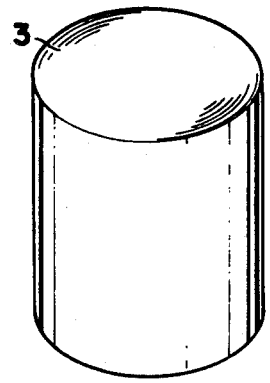
Figure 3A:
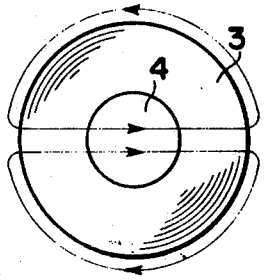
Figure 3B:
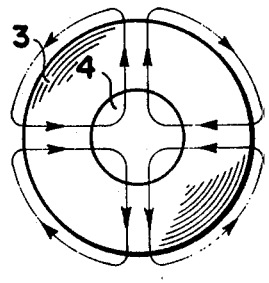
Figure 1B:
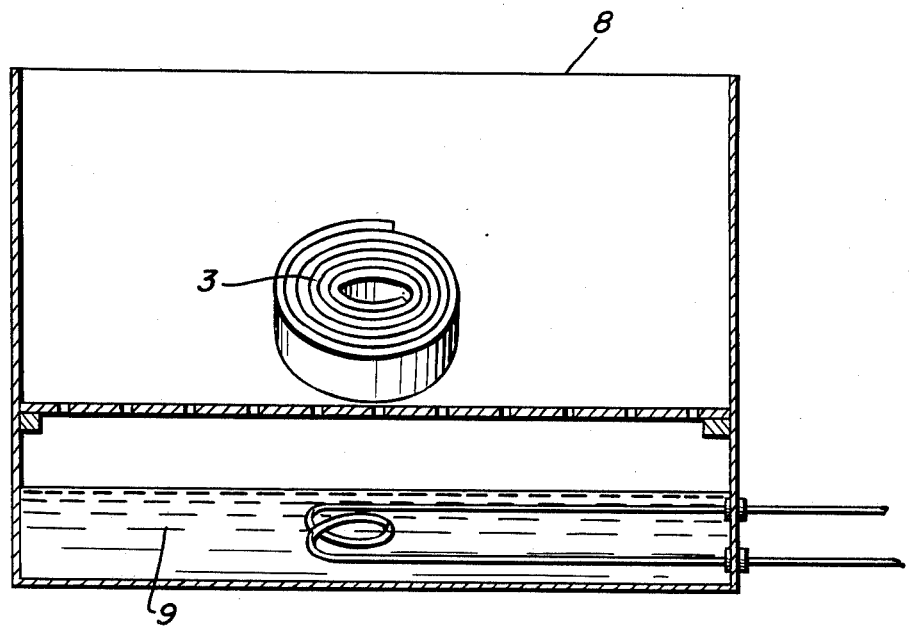
Figure 1C:
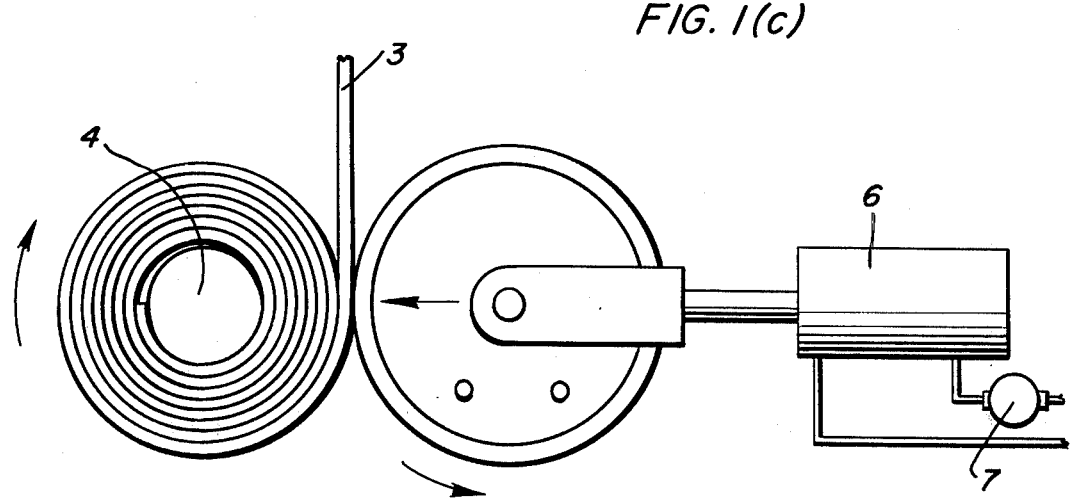

FIGS. 2a and 2b are perspective view showing the cylindrical anisotropic ferrite magnets obtained by winding the ferrite sheets formed by rolling in the manner as shown in FIGS. 1(a) to 1(c), according to different embodiments of the present invention; and FIGS. 3a and 3b are views showing by arrows the directions of the magnetic field of the cylindrical anisotropic ferrite magnets produced according to the method of the present invention.

The present invention is now described in detail by way of embodiments thereof.

First, pulverized anisotropic ferrite is prepared which has a magnetoplumbite type crystal structure of the hexagonal system composed mainly of a chemical composition $MO.6Fe_2O_3$ (where M is Ba, Sr, Pb or such). The ferrite, which has a conventional grain size (i.e., about 3 microns or less), has the easy axis in the direction of the C-axis and has been calcined with its crystal growth well advanced. The ferrite is added to an organic binder such as polyvinyl butyral, a plasticizer, a solvent, etc., and the mixture 1, after being well kneaded, is rolled into a sheet with calender rollers 2 which are driven at substantially the same speed as shown in FIG. 1. The ferrite according to the present invention is a hexagonal crystal having the easy axis along the C-axis, so that the crystal tends to develop in the planar direction perpendicular to the C-axis and is apt to be made into thin and flat plate-shaped crystal grains. When these flat plate-shaped crystal grains are subjected to rolling with a roll under a tension applied in the direction perpendicular to the direction of rolling, the crystal grains are laid one on the other in a natural way and in regular order. Thus, the easy axis, which has been directed randomly, is now forcibly orientated in a set direction. In this way, owing to the configuration of the crystal grains, there can be formed with ease an anisotropic ferrite sheet having the easy axis in the direction perpendicular to the sheet face by merely rolling the ferrite sheets 3. Here, in order to completely align the particles with their easy axis being oriented in a direction perpendicular to the plane of the ferrite sheet a care must be taken that the calender rollers should be driven at substantially same speed. The more the degree of rolling is increased, the more correct becomes the orientation of the C-axis. If rolling is carried out while applying a magnetic field vertically to the sheet face from the outside, the C-axis is forcibly orientated by the action of said magnetic field, resulting in further improved magnetic properties. More preferably, heating in the range of about 50°-100° C is applied while rolling so as to further improve the magnetic properties.

The rolled ferrite sheet is then fed to a chamber 8 which contains solvent as alcohol at about 30° to 40° C. The sheet is exposed to the alcoholic atmosphere for about 20 to 40 hours so that a desired viscosity favorable for making the sheet integral when it is wound may be obtained. The inventors have found that about 40 hours are favorable when a diameter of a mandrel on which the sheet is to be wound is less than $20^{\phi m}$/m, and about 20 hours when the diameter is more than $20^{\phi m}$/m. Thus, a ferrite sheet having a desired viscosity is completed.

The ferrite sheet treated with the alcoholic circumstance is wound on a mandrel having a diameter of $30^{\phi}$mm. under pressure of 1.0 kg/cm². The pressure is applied by a roller 5 which has a rolling surface of heat-resistance hard rubber. The surface of the roller 5 is heated at about 30° to 90° C by a heater (not shown). The roller 5 is connected to an air cylinder 6 which presses the roller 5 toward a mandrel 4 at a desired pressure. In order to keep the predetermined pressure when the pressure of the roller is likely to change due to continuous winding of the sheet, a regulator 7 is provided for controlling the pressure. Here, a care must be taken that starting end of the sheet is formed in a edge-shaped in cross section as shown in FIG. 1(c) so that any stress to that portion may not produce a crevice or crack in the ferrite sheet. When the starting portion is not formed in a tapered shape as described, the inventors have found that cracks and crevices are produced during sintering because stresses are applied to the starting portion of the ferrite sheet. Preferably, before the sheet is wound the mandrel may be coated with alcohol on its surface where the starting portion of the sheet contacts, so that the aforesaid tapered end of the sheet may be completely close to the surface of the mandrel.

The ferrite sheet is, thus, convolutely wound about the mandrel 4 so that no space will be produced between the adjacent layers of the wound sheet as shown in FIG. 2(a). Alternatively, the ferrite sheet 3 is convolutely and tightly wound up, without using any mandrel, so that no space will be created between the layers as shown in FIG. 2(b). The wound-up sheet is then cut to form a desired cylindrical shape. The thus shaped cylindrical mass is then sintered at 1,100 to 1,300° C. After sintering a magnetic field is applied in a known method to thereby obtain a ferrite magnet which has the easy axis in the radial direction and which has been magnetized to have two poles as shown in FIG. 3(a) or four poles as shown in FIG. 3(b).

Thus, according to the method of the present invention, a kneaded mixture of pulverized ferrite and a viscous binding agent is rolled with a calender rollers which are driven at substantially the same speed to make and anisotropic ferrite magnet sheet having the easy axis directed in the direction perpendicular to the plane of the ferrite sheet. Since the ferrite sheet which has easy axis oriented in a direction perpendicular to the plane thereof is then kept in a certain conditions of an alcoholic circumstance, a very small pressure may be enough for making the sheet be integral when the sheet is being wound, whereas a greater pressure as have been applied in the conventional method has introduced strains and cracks in the products. Further, in the present invention there is no need of preparing a different mold for every different size of magnet to be produced, so that the method of the present invention proves extremely economical in manufacture of the magnets. Moreover, since the kneaded mixture of the pulverized ferrite is rolled by calender rollers, the ferrite distribution in the product is very uniform, so that, after magnetization, the magnetic flux density becomes uniform. Thereby, many types of magnetization may be used such as pulse type magnetization, multipoles magnetization, one-side magnetization and the like. Furthermore, the ferrite magnet produced in accordance with the present invention has higher density and stronger mechanical strength than the conventional ones.

With respect to an economic aspect, the inventors have found that an addition of Ba and/or Pb peroxide(s) to the ferrite material presented a great advantage in a speeding-up of the sintering process without lowering magnetic and mechanical characteristics of the product.

Although the present invention has been disclosed with reference to preferred embodiments thereof, many modifications and alterations may be made within the spirit of the present invention.

1. A method of producing an anisotropic ferrite magnet having a radial particle orientation comprising mixing pulverized ferrite particles with an organic binder suitable for forming ferrite magnets to develop the particles in the planar direction perpendicular to the C-axis, said pulverized ferrite particles having a hexagonal crystal structure of the magnetoplumbite type and comprising a substance having the chemical composition $MO:6Fe_2O_3$ in which M is Ba, Sr or Pb, said pulverized ferrite having been calcined and having a well-advanced crystal growth, rolling said mixture between calender rollers to form a ferrite sheet, said calender rollers being driven at substantially the same speed to align the particles with their easy axis oriented in a direction perpendicular to the plane of the ferrite sheet, placing said ferrite sheet in a solvent atmosphere for said ferrite sheet at about 30° 40° C, so as to yield a desired viscosity in said ferrite sheet for making said sheet integral during subsequent winding, said winding of said sheet being done convolutely and at tightly under pressure and a temperature of about 30°-90° to form a cylindrical shaped integral mass, free of air space between adjacent layers of said wound sheet which form said integral mass, wherein the starting end of said sheet has the cross section shown in FIG. 1 (c) of the drawings. Cutting said cylindrical shaped integral mass into the shape of a cylinder, sintering the cylindrically shaped ferrite mass at about 1,000° to 1,3000° C and applying a magnetic field to said sintered mass to complete said anisotropic ferrite magnet having said radial particle orientation.

2. The method of claim 1 in which said solvent is an alcohol.

3. The method of claim 1 in which said ferrite sheet is wound on a mandrel under said pressure, said pressure being applied by a roller having a rolling surface comprising a heat-resistance rubber.

4. The method of claim 3 in which said rolling surface is heated to about 30° to 90° C.

5. The method of claim 4 in which said mandrel has a diameter of about 30 $\phi$ mm and said pressure under which said ferrite sheet is wound is about 1.0 kg/cm².

6. The method of claim 1 in which said ferrite has a grain size of about three microns or less.

7. The method of claim 1 in which said oganic binder is polyvinyl butyral.

8. The method of claim 1 in which heat in the range of 50° to 100° C is applied while said mixture is rolled between said calender rollers.

9. The method of claim 1 in which said ferrite sheet is kept in said solvent atmosphere for about 20 to 40 hours.

* * * * *